United States Patent [19]
Boudou et al.

[11] Patent Number: 5,928,326
[45] Date of Patent: Jul. 27, 1999

[54] PROGRAMMABLE, MULTI-BUFFER DEVICE AND METHOD FOR EXCHANGING MESSAGES BETWEEN PEER-TO-PEER NETWORK NODES

[75] Inventors: Alain Boudou, Vert; Michel d'Hoe, Croissy sur Seine; Majed Halila, Lyons, all of France

[73] Assignee: Bull S.A., Louveciennes, France

[21] Appl. No.: 08/674,488

[22] Filed: Jun. 28, 1996

[30]  Foreign Application Priority Data

Jun. 30, 1995 [FR] France ................................ 95 07936

[51] Int. Cl.$^6$ .................................................. G06F 13/00
[52] U.S. Cl. .......................................................... 709/212
[58] Field of Search ..................... 395/200.32, 200.42, 395/871, 872, 873, 874, 875, 876, 877, 878; 709/201, 203, 212, 213, 214

[56]  References Cited

U.S. PATENT DOCUMENTS 5,463,762  10/1995  Morrisey et al. ................... 395/185.02

FOREIGN PATENT DOCUMENTS 0380856  9/1989  European Pat. Off. .
0557025  2/1993  European Pat. Off. .

OTHER PUBLICATIONS

IBM Technical Disclosure Bulletin, vol. 28, No. 12, May 1986, Armonk, NY, US., pp. 5364–5365 "Data Buffer Mechanism".

*Primary Examiner*—Moustafa M. Meky
*Attorney, Agent, or Firm*—Kerkam, Stowell, Kondracki & Clarke, P.C.; Edward J. Kondracki

[57]  ABSTRACT

The invention pertains to the information systems field, in which a system is constituted by several machines which, in order to exchange data, communicate with one another through serial links. The invention relates more specifically to a device for exchanging messages between two data processing machines by means of a bidirectional serial link (2). In each machine, the device comprises a first outgoing buffer memory (20) for containing only request-type messages to be sent through the bidirectional serial link (2), a second outgoing buffer memory (21) for containing only response-type messages to be sent through the bidirectional serial link (2), a first incoming buffer memory (22) for containing only request-type messages received from the bidirectional serial link (2), a second incoming buffer memory (23) for containing only response-type messages received from the bidirectional serial link (2), a first switching unit (24) which authorizes the transfer of a message from the first outgoing buffer memory (20) or from the second outgoing buffer memory (21), respectively, to the bidirectional serial link (2) when a first incoming buffer memory (32) or a second incoming buffer memory (33), respectively, of the second machine has sufficient space to receive said message, and a second switching unit (25) which transfers the request-type messages or the response-type messages, respectively, received from the bidirectional serial link (2), to the first incoming buffer memory (22) or the second incoming buffer memory (23), respectively.

2 Claims, 2 Drawing Sheets

PROGRAMMABLE, MULTI-BUFFER DEVICE AND METHOD FOR EXCHANGING MESSAGES BETWEEN PEER-TO-PEER NETWORK NODES

BACKGROUND OF THE INVENTION

1. Field of the Invention

The invention pertains to the information systems field, in which a system is constituted by several machines which, in order exchange data, communicate with one another through serial links.

2. Description of the Related Art

A first machine A exchanges data with a second machine B by sending a request to the machine B. Following a read request sent by the machine A to the machine B, the machine B sends the machine A a response which contains the data requested by the machine A. Following a write request sent by the machine A to the machine B, the machine B sends the machine A a response which contains the status of the acceptance of the request, such as an acknowledgement for example. The second machine B exchanges data with the first machine A symmetrically.

The requests and the responses constitute messages which flow between the two machines by means of a bidirectional serial transmission link. This means that the messages are emitted successively in the form of a stream of signals transported by the bidirectional serial transmission link. Various means for the embodiment of bidirectional serial transmission links are known. The use of one or more electrical lines linking the two machines and the use of fiber optics may be cited as non-limiting examples. For example, U.S. Pat. No. 5,347,538, filed in the name of the Applicant, describes a bidirectional serial link using an electrical line.

In the current state of the art, in each machine, the messages to be sent are stored in the order of their appearance in an outgoing buffer memory of the first-in-first-out type, to wait until they can be sent through the bidirectional serial transmission link. Likewise, in each machine, the messages received from the transmission line are stored in the order of their reception in an incoming buffer memory of the first-in-first-out type, to wait until they can be processed by the receiving machine.

The sending of a message through the bidirectional serial transmission link requires sufficient space in the incoming buffer memory of the receiving machine to accept this message. The incoming buffer memory of the receiving machine is cleared as the messages are processed by this machine. If the message is a request, its processing produces a response which is stored in the outgoing buffer memory of the machine which has received this request.

A complete filling of the buffer memories in both machines can block any sending of messages. For example, in the case in which the outgoing and incoming buffer memories are full in each of two machines communicating with one another, if the first message submitted in each of the incoming buffer memories is a request, it cannot be processed unless sufficient space to receive the response has been released in the outgoing buffer memory. But the release of space in the outgoing buffer memory cannot occur unless sufficient space to receive the first message from the outgoing buffer memory has been released in the incoming buffer memory of the other machine. The incoming and outgoing buffer memories block each other's release.

It is conceivable for the outgoing and incoming buffer memories to be given sufficient size so that they are not filled up by the abundance of messages generated by the machines. However, the system's capacity for communication would be limited by the size of the buffer memories. With a given buffer memory size, it would be difficult to increase the rate of exchanges beyond that provided.

It is also conceivable for each machine to be provided with a stack which takes over from the incoming buffer memory. The requests submitted as output from the incoming buffer memory would be stored in this stack, to wait for available space in the outgoing buffer memory to receive the responses to these requests. This would offer the advantage of releasing the incoming buffer memory. However, the space problem would only be postponed and would recur when this stack is completely full. For high-performance systems, it would be necessary to provide buffer memories or stacks with high capacity. Despite the current large-scale integration capacities in electric circuits, it is preferable to allocate a minimum of space to the communication functions and to allocate this space to other functions.

SUMMARY OF THE INVENTION

The object of the invention is to use buffer memories of reduced size without incurring the above-described space problem of these buffer memories.

The invention proposes a device for exchanging messages between two data processing machines by means of a bidirectional serial link, characterized in that, for each machine, it comprises a first outgoing buffer memory for containing only request-type messages to be sent through the bidirectional serial link, a second outgoing buffer memory for containing only response-type messages to be sent through the bidirectional serial link, a first incoming buffer memory for containing only request-type messages received from the bidirectional serial link, a second incoming buffer memory for containing only response-type messages received from the bidirectional serial link, a first switching unit which authorizes the transfer of a message from the first outgoing buffer memory or from the second outgoing buffer memory, respectively, to the bidirectional serial link if a first incoming buffer memory or a second incoming buffer memory, respectively, of the other machine has sufficient space available to receive this message, a second switching unit which transfers the request-type messages or the response-type messages, respectively, received from the bidirectional serial link, to the first or the second incoming buffer memory, respectively.

The device according to the invention obtains the following result. The release of the second incoming buffer memory is never blocked by a request-type message waiting to be processed, since it contains only response-type messages. Thus, the release of the second outgoing buffer memory of a first machine occurs, via the bidirectional serial link, as a result of the release of the second incoming buffer memory of the second machine. In the first machine, the release of the second outgoing buffer memory in turn allows the requests contained in the first incoming buffer memory to be processed. The release of the first incoming buffer memory, having thus been obtained in the first machine, allows the release of the first outgoing buffer memory of the second machine via the bidirectional serial link. The size of the buffer memories may be reduced to a size which is sufficient to store just a few messages, or even a single message.

The first switching unit can obtain information about the space available in the incoming buffer memories of the other machine in various ways. For example, the reception of a response in one machine indicates a release of the request which originated this response in another machine. However, the processing of such information would require a certain amount of time, which could complicate and slow the exchanges of messages.

This is why the invention proposes to add to the message exchange device a register in which the second switching unit accumulates tokens of a first type received in the form of messages from the other machine through the bidirectional serial link and from which the first switching unit, with each transfer of a message from the first outgoing buffer memory to the bidirectional serial link, obtains a quantity of these same tokens which represents the length of this message, a register in which the second switching unit accumulates tokens of a second type received in the form of messages from the other machine through the bidirectional serial link and from which the first switching unit, with each transfer of a message from the second outgoing buffer memory to the bidirectional serial link, obtains a quantity of these same tokens which represents the length of this message, and a last buffer memory in which a quantity of tokens of the first type which represents the space made available by the removal of messages from the first incoming buffer memory and a quantity of tokens of the second type which represents the space made available by the removal of messages from the second incoming buffer memory, are accumulated in the form of messages, which messages accumulated in the last buffer memory are transferred to the bidirectional serial link by the switching unit.

Thus, the transfers of tokens between the two machines occur in between other message transfers based on the availability of the serial link, and they provide exact information about the release of each of the incoming memories using a minimum of space and in a minimum amount of time. A message of the token type can be reduced to its header, which indicates only its type. This allows the second switching unit to easily distinguish the tokens from other messages and to direct them to the appropriate register.

Each type of token represents a fixed number of bytes available in the buffer memory associated with this type of token. Each type of token also represents a fixed number of bytes within each message. However, if this number is set too high, a short message will run the risk of reserving itself an excessive number of bytes in the buffer memories. If the number of bytes is set too low, numerous tokens will be required for the long messages, which runs the risk of congesting the bidirectional serial link.

It is advantageous to improve the device of the invention by making it possible to program a correspondence between each type of token and a number of bytes within a message before starting up the device.

The invention also proposes a process for executing at least one command generated by a first data processing machine or by another data processing machine, respectively, in a memory of the other machine or the first machine, respectively, using the device described.

A process of this type consists of
transforming this command into a request-type message,
storing this request in a first outgoing buffer memory of the first machine or of the other machine, respectively,
transferring this request, by means of a bidirectional serial link, into a first incoming buffer memory of the other machine or of the first machine, respectively,
obtaining this request from the buffer memory in order to transform it into a response-type message by executing this command in the memory of the other machine or of the first machine, respectively,
storing this response in a second outgoing buffer memory of the other machine or of the first machine respectively,
transferring this response, by means of the bidirectional serial link, into a second incoming buffer memory of the first machine or of the other machine, respectively,
obtaining this response from the second incoming buffer memory of the first machine or of the other machine, respectively, in order to acknowledge this command.

BRIEF DESCRIPTION OF THE DRAWINGS

An example of embodiment of the invention is explained in the description below in reference to the figures.

DESCRIPTION OF THE PREFERRED EMBODIMENTS

Figure 1:
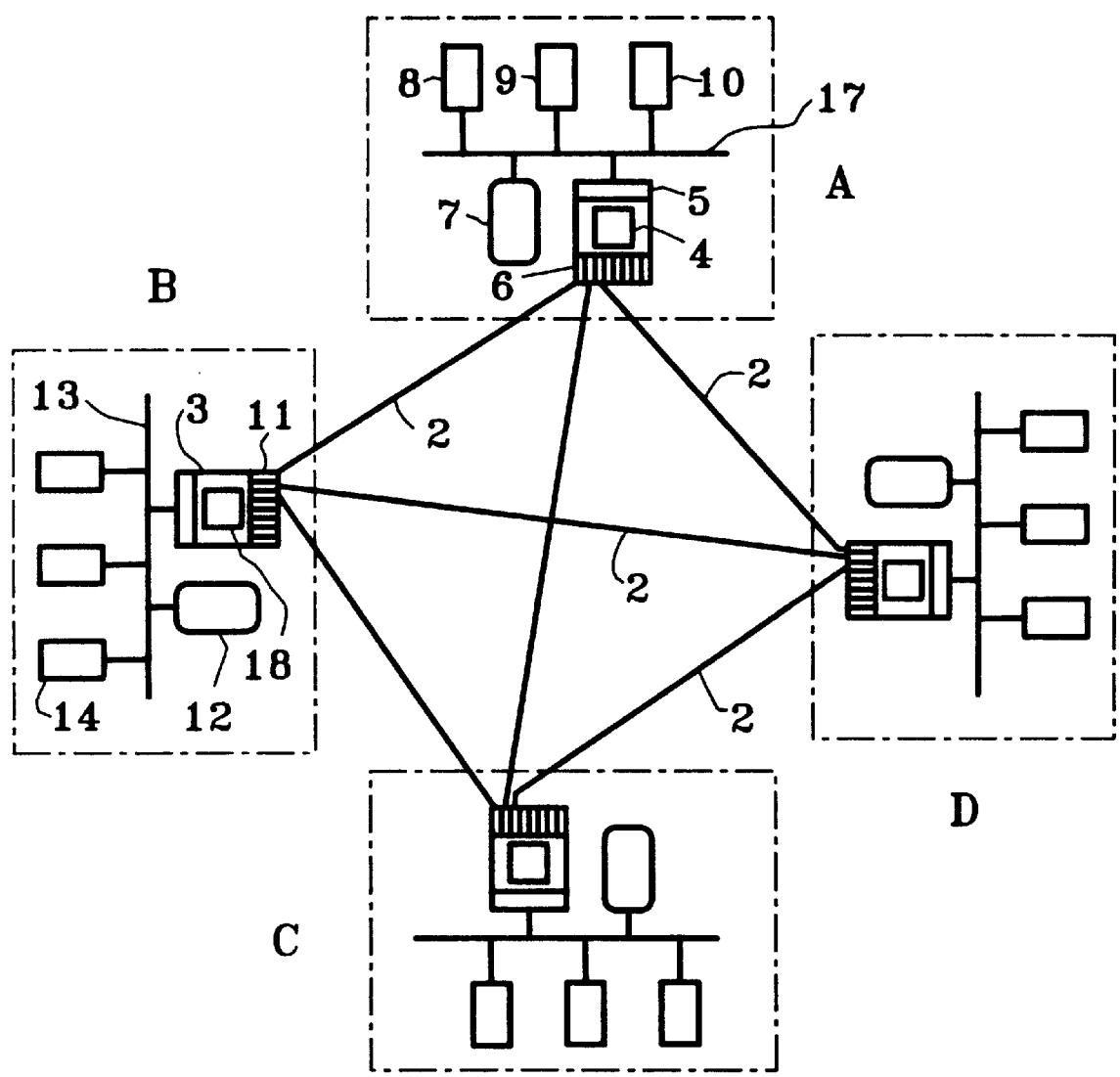
FIG. 1 represents an information system suitable for using the invention.

The information system in FIG. 1 comprises several machines A, B, . . . , C, D which exchange messages with one another by means of bidirectional serial links 2 which connect the machines two by two. A machine A essentially comprises at least a processor 8, a memory 7 and an input-output module 5 for exchanging messages with other machines B, . . . , C, D with similar configurations. The machine A may comprise one or more additional processors 9, 10. A bus 17 transports commands, addresses and data between the processor or processors 8, 9, 10, the memory 7 and the input-output module 5. The input-output module 5 comprises several sender-receiver couplers 6. Each bidirectional serial link 2 for exchanging messages with one of the other machines B, . . . , C, D is assigned a coupler 6 for the input-output module 5. The input-output module 5 also comprises a unit 4 for transforming commands and data from the bus 17 into messages and vice versa.

By way of example, the description below describes an exchange of messages between two machines A and B. The machine B includes an input-output module 3 and a memory 12, between which a bus 13 transports commands, addresses and data. A coupler 11 for the input-output module 3 is assigned to the bidirectional serial link 2 for exchanging messages with the machine A.

In the execution of a process, the processor 8 of the machine A, for example, reads and writes data in the memory 7 of the machine A or in the memory of another machine B, . . . , C or D. In order to read or, respectively, write a datum into the memory 12 of the machine B, the processor 8 sends a read command or, respectively, a write command to the input-output module 5 by means of the bus 17. The unit 4 transforms this read command or write command, respectively, into a request-type message which it directs to the coupler 6 assigned to the bidirectional serial link 2 for exchanging messages between the machine A and the machine B. The bidirectional serial link 2 transmits the request to the coupler 11 of the input-output module 3. The request triggers, in the input-output module 3, a reading or a writing, respectively, in the memory 12 by means of the bus 13. The input-output module 3 then generates a response-type message which it directs to the coupler 11. The response contains the datum to be read in the memory 12, or an acknowledgement of a writing executed in the memory 12, respectively. The bidirectional serial link 2 transmits the response to the coupler 6 of the input-output module 5. If the command sent by the processor 8 was a read command, the input-output module 5 transmits to the processor 8 the datum contained in the response. If the command sent by the processor 8 was a write command, the input-output module 5 processes the acknowledgement contained in the response.

The operation described above occurs symmetrically in the execution of a process by a processor 14 of the machine B requiring access to the memory 7 in the machine A.

Thus, each of the machines A, B, . . . , C, D accesses the memory of another machine as though this memory were directly connected to its internal bus.

For each pair of machines A, B which exchange messages, a coupler 6 of the machine A, a coupler 11 of the machine B and the bidirectional serial link connecting these two couplers constitute a device for exchanging messages between two data processing machines.

Figure 2:
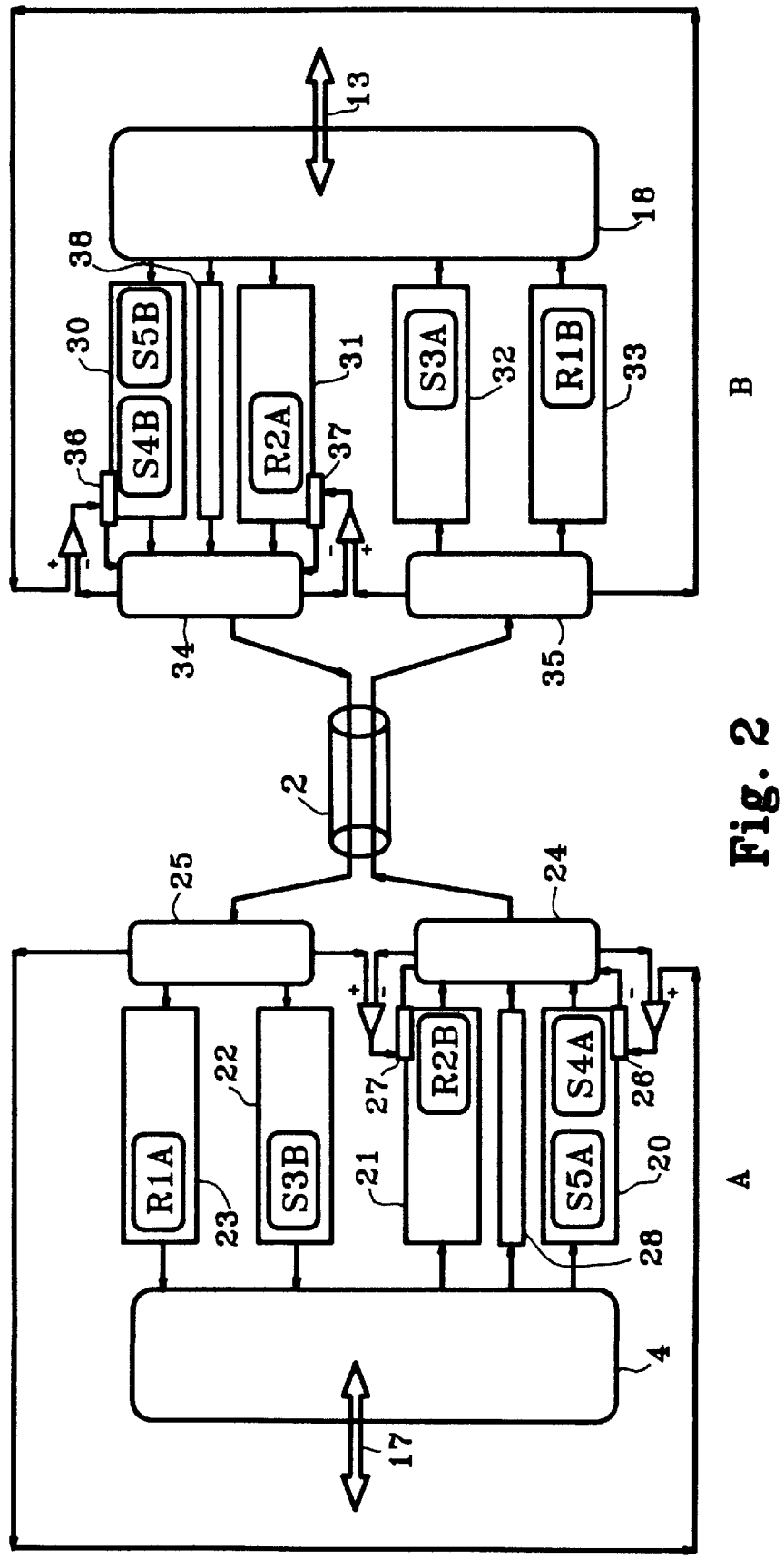
FIG. 2 represents a device according to the invention.

Such a device is described in greater detail with the aid of FIG. 2.

In the coupler 6 of the machine A, the following elements may be distinguished. A buffer memory 20 called an outgoing buffer memory is provided for receiving the request-type messages generated by the unit 4 in the input-output module 5 from a read or write command sent by a processor of the first machine A to the input-output module 5. The requests accumulate there to wait until they can be sent through the bidirectional serial link 2. A buffer memory 21 called an outgoing buffer memory is provided for receiving the response-type messages which result from a reading or a writing in the memory of the machine A, following a request received by the input-output module 5. Each response is stored there to wait until it can be sent through the bidirectional serial link 2. A buffer memory 22, called an incoming buffer memory is provided for receiving the request-type messages received from the bidirectional serial link 2. The requests accumulate there to wait until they can be processed by the unit 4. A buffer memory 23 called an incoming buffer memory is provided for receiving the response-type messages received from the bidirectional serial link 2. The responses accumulate there to wait for processing by the unit 4. The processing of a response by the unit 4 is a function of its contents. It consists of transferring the data it contains to the processor which originated a read request to which it is responding. It consists, for example, of updating a status register when it responds to a write request.

Likewise, in the coupler 11 of the machine B, the following elements may be distinguished. A buffer memory 30 called an outgoing buffer memory is provided for receiving the request-type messages generated by a unit 18 in the input-output module 3 from a read or write command sent by a processor of the machine B to the input-output module 3. The requests accumulate there to wait until they can be sent through the bidirectional serial link 2. A buffer memory 31 called an outgoing buffer memory is provided for receiving the response-type messages which result from a reading or a writing in the memory of the machine B, following a request received by the input-output module 3. Each response is stored there to wait until it can be sent through the bidirectional serial link 2. A buffer memory 32 called an incoming buffer memory is provided for receiving the request-type messages received from the bidirectional serial link 2. The requests accumulate there to wait until they can be processed by the unit 18. A buffer memory 33 called an incoming buffer memory is provided for receiving the response-type messages received from the bidirectional serial link 2. The responses accumulate there to wait for processing by the unit 18. The processing of a response by the unit 18 is a function of its contents. It consists of transferring the data it contains to the processor which originated a read request to which it is responding. It consists, for example, of updating a status register when it responds to a write request.

The bidirectional serial link 2 has, at each of its ends, a sender-receiver coupler, one of which is assigned to the machine A, and the other of which is assigned to the machine B.

In the coupler 6, a switching unit 24 authorizes the transfer of a message from the buffer memory 20 or the buffer memory 21, respectively, to the bidirectional serial link 2 if the buffer memory 32 or the buffer memory 33, respectively, has sufficient space available to receive this message. The switching unit 24 has a message output connected to the input of the emitter of the bidirectional serial link 2 assigned to the machine A. A switching unit 25 has a message input connected to the receiver of the bidirectional serial link 2 assigned to the machine A. The switching unit 25 transfers the request-type messages received from the bidirectional serial link 2 to the buffer memory 22 and the response-type messages received from the bidirectional serial link 2 to the buffer memory 23.

Likewise, in the coupler 11, a switching unit 34 authorizes the transfer of a message from the buffer memory 30 or the buffer memory 31, respectively, to the bidirectional serial link 2 if the buffer memory 22 or the buffer memory 23, respectively, has sufficient space available to receive this message. The switching unit 34 has a message output connected to the input of the emitter of the bidirectional serial link 2 assigned to the machine B. A switching unit 35 has a message input connected to the receiver of the bidirectional serial link 2 assigned to the machine B. The switching unit 35 transfers the request-type messages received from the bidirectional serial link 2 to the buffer memory 32 and the response-type messages received from the bidirectional serial link 2 to the buffer memory 33.

In the coupler 6, a register 26 is assigned to the buffer memory 20. The value contained in the register 26, expressed in tokens, represents the space available in the buffer memory 32. A register 27, assigned to the buffer memory 21, contains a value, expressed in tokens, which represents the space available in the memory 33. A buffer memory 28 contains tokens generated by the unit 4. The buffer memory 28 is the first-in-first-out type. These tokens represent the space in the buffer memories 22 and 23 released by the unit 4. A different type of token is associated with each of the buffer memories 22 and 23. The switching unit 24 authorizes, as a matter of priority, the transfer of the tokens in the form of messages, to the bidirectional serial link 2. The output from each of the buffer memories 20, 21 and 28 is connected to a message input in the switching unit 24.

Likewise, in the coupler 11, a register 36 is assigned to the buffer memory 30. The value contained in the register 36, expressed in tokens, represents the space available in the buffer memory 22. A register 37 assigned to the buffer memory 31 contains a value, expressed in tokens, which represents the space available in the memory 23. A buffer memory 38 contains tokens generated by the unit 18. The buffer memory 38 is the first-in-first-out type. These tokens represent the space in the buffer memories 32 and 33 released by the unit 18. The switching unit 34 authorizes, as a matter of priority, the transfer of the tokens in the form of messages, to the bidirectional serial link 2. The output from each of the buffer memories 30, 31 and 38 is connected to a message input in the switching unit 34.

The device described operates in the following way. Initially, the registers 26 and 27 contain a number of tokens which represents the maximum storage capacity of the buffer memories 32 and 33. Likewise, the registers 36 and 37 contain a number of tokens which represents the maximum storage capacity of the buffer memories 22 and 23. Each message exchanged between two machines A and B contains a header which identifies its type: request, response, request token or response token. If the request or response-type messages vary in length, this header also indicates the number of tokens which represents the space required to contain the message.

The unit 4 accumulates requests S4A, S5A in the form of messages in the buffer memory 20 in order of their appearance.

If the register 26 contains a number of tokens greater than or equal to that which represents the space required to contain the request message S4A, the switching unit 24 obtains the message S4A from the buffer memory 20 and transfers it to the serial link 2. Simultaneously, it extracts from the register 26 the number of tokens which represents the space required to contain the message S4A. The serial link 2 then transfers the message S4A to the switching unit 35. The switching unit 35 identifies the header of the message received as a request header. It then stores the message S4A in the memory 32. When the buffer memory 31 contains sufficient space to receive a response R3A to a request S3A, the unit 18 obtains the message S3A from the buffer memory 32 and stores the response R3A in the buffer memory 31. The response R3A is not represented in FIG. 2 because this figure represents the device described at a given moment in its operation, and a request and response to this request are never submitted simultaneously. The unit 18 simultaneously stores, in the buffer memory 38, a number of request tokens which represents the space required to contain the request S3A, and this space is released in the buffer memory 32 by the removal of the request S3A.

If the register 27 contains a number of tokens greater than or equal to that which represents the space required to contain the response message R2B, the switching unit 24 obtains the message R2B from the buffer memory 21 and transfers it to the serial link 2. Simultaneously, it extracts from the register 27 the number of tokens which represents the space required to contain the message R2B. The serial link 2 then transfers the message R2B to the switching unit 35. The switching unit 35 identifies the header of the message received as a response header. It then stores the message R2B in the memory 33. When the unit 18 obtains a response R1B from the buffer memory 33, possibly in order to transfer its contents to the bus 13, the unit 18 simultaneously stores, in the buffer memory 38, a number of response tokens which represents the space required to contain the response R1B, and this space is released in the buffer memory 33 by the removal of the response R1B.

As long as there are response tokens or request tokens in the buffer memory 38, the switching unit 34 directs these tokens in the form of messages to the serial link 2. The serial link 2 then transfers these messages to the switching unit 25. If the switching unit 25 identifies the header of a message received as the header of a response token, it adds this token to the register 27. If the switching unit 25 identifies the header of a message received as the header of a request token, it adds this token to the register 26.

The unit 18 accumulates requests S4B, S5B in the form of messages in the buffer memory 30 in order of their appearance.

If the register 36 contains a number of tokens greater than or equal to that which represents the space required to contain the request message S4B, the switching unit 34 obtains the message S4B from the buffer memory 30 and transfers it to the serial link 2. Simultaneously, it extracts from the register 36 the number of tokens which represents the space required to contain the message S4B. The serial link 2 then transfers the message S4B to the switching unit 25. The switching unit 25 identifies the header of the message received as a request header. It then stores the message S4B in the memory 22. When the buffer memory 21 contains sufficient space to receive a response R3B to a request S3B, the unit 4 obtains the message S3B from the buffer memory 22 and stores the response R3B in the buffer memory 21. The response R3B is not represented in FIG. 2 because this figure represents the device described at a given moment in its operation, and a request and a response to this request are never submitted simultaneously. The unit 4 simultaneously stores, in the buffer memory 28, a number of request tokens which represents the space required to contain the request S3B, and this space is released in the buffer memory 22 by the removal of the request S3B.

If the register 37 contains a number of tokens greater than or equal to that which represents the space required to contain the response message R2A, the switching unit 34 obtains the message R2A from the buffer memory 31 and transfers it to the serial link 2. Simultaneously, it extracts from the register 37 the number of tokens which represents the space necessary to contain the message R2A. The serial link 2 then transfers the message R2A to the switching unit 25. The switching unit 25 identifies the header of the message received as a response header. It then stores the message R2A in the memory 23. When the unit 4 obtains a response R1A from the buffer memory 23, possibly in order to transfer its contents to the bus 17, the unit 4 simultaneously stores, in the buffer memory 28, a number of response tokens which represents the space required to contain the response R1A, and this space is released in the buffer memory 23 by the removal of the response R1A.

As long as there are response tokens or request tokens in the buffer memory 28, the switching unit 24 directs these tokens in the form of messages to the serial link 2. The serial link 2 then transfers these messages to the switching unit 35. If the switching unit 35 identifies the header of a message received as the header of a response token, it adds this token to the register 37. If the switching unit 35 identifies the header of a message received as the header of a request token, it adds this token to the register 36.

It is advantageous to reduce the size of the buffer memories 21, 23, 31, and 33 to the size required to contain a single response. The register 27 can then be reduced to a binary register set to 1 by the switching unit 25 upon reception of a response token and set to zero by the switching unit 24 at the emission of a response message. The register 37 can then be reduced to a binary register set to 1 by the switching unit 35 upon reception of a response token and set to zero by the switching unit 34 at the emission of a response message.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

We claim:

1. A process for executing at least one command generated by a first data processing machine (A) or by a second data processing machine (B), respectively, in a memory of the second machine (B) or of the first machine (A), respectively, characterized in that it consists of transforming said at least one command into a request-type message;

storing said request-type message in a first outgoing buffer memory (20) of the first machine (A) or a first outgoing buffer memory (30) of the second machine (B), respectively;

transferring said request-type message by means of a bidirectional serial link (2), into a first incoming buffer memory (32) of the second machine (B) or a first incoming buffer memory (22) of the first machine (A), respectively;

obtaining said request-type message from the buffer memory (32) or the buffer memory (22), respectively, and generate a response-type message by executing said at least one command in the memory of the second machine (B) or of the first machine (A), respectively;

storing said response-type message in a second outgoing buffer memory (31) of the second machine (B) or in a second outgoing buffer memory (21) of the first machine (A); respectively;

transferring said response-type message, by means of the bidirectional serial link (2), into a second incoming buffer memory (23) of the first machine (A), or into a second incoming buffer memory (33) of the second machine (A); and obtaining said response-type message from the second incoming buffer memory (23) of the first machine (A), or from the second incoming buffer memory (33) of the second machine (B), respectively, in order to acknowledge said at least one command; wherein said transfer of said request-type message in the first incoming buffer memory (32) of the second machine (B) or in the first incoming buffer memory (22) of the first machine (A), respectively, is accompanied by a removal of tokens of a first type in a first register (26) of the first machine (A) and a second register (36) of the second machine (B), respectively, which quantity of tokens removed represents a length of said request-type message;

the removal of a request-type message from the first incoming buffer memory (32) of the second machine or the first incoming buffer memory (22) of the first machine, respectively, is accompanied by an addition of tokens of the first type in a buffer memory (38) of the second machine (B) or in a buffer memory (28) of the first machine (A), respectively, which quantity of tokens added represents a length of said request-type message;

the tokens of the first type are transferred in the form of messages from the buffer memory (38) of the second machine or the buffer memory (28) of the first machine, respectively, to the first register (26) of the first machine or the second register (36), respectively, of the second machine, by means of the bidirectional serial link (2);

the transfer of a response-type message in the second incoming buffer memory (23) of the first machine (A) or in the second incoming buffer memory (33) of the second machine (B), respectively, is accompanied by a removal of tokens of a second type in a register (37) of the second machine (B) or a register (27) of the first machine (A), respectively, which quantity of tokens obtained represents the length of this response-type message;

the removal of a response-type message from the second incoming buffer memory (23) of the first machine (A) or the second incoming buffer memory (33) of the second machine (B), respectively, is accompanied by an addition of tokens of the second type in the buffer memory (28) of the first machine (A) or the buffer memory (38) of the second machine (B), respectively, which quantity of tokens added represents the length of said response-type message and;

the tokens of the second type are transferred in the form of messages from the buffer memory (28) of the first machine or the buffer memory (38) of the second machine, respectively, to the register (37) of the second machine or the register (27) of the first machine, respectively, by means of the bidirectional serial link (2).

2. The process for executing at least one command generated by a first data processing machine (A) respectively, in a memory of the second machine (B) or of the first machine (A), respectively, according to claim 1, characterized in that at its initialization, a unit of tokens of the first type is determined to correspond to a number of bytes within a request-type message, and in that a unit of tokens of the second type is determined to correspond to a number of bytes within a response-type message.

* * * * *